United States Patent Office 3,429,104
Patented Feb. 25, 1969

3,429,104
EXTRACTION PROCESS AND PRODUCT
Julian J. Hirshfeld, Decatur, Ala., assignor to Monsanto Company, St. Louis, Mo., a corporation of Delaware
No Drawing. Filed May 26, 1965, Ser. No. 459,073
U.S. Cl. 55—74   8 Claims
Int. Cl. B01d 53/02

ABSTRACT OF THE DISCLOSURE

Phenols can be readily removed from fluids by passing the liquid or gas in intimate contact with fibers of polymers of acrylonitrile.

---

This invention relates to the physical separation of phenols from fluids. More particularly, this invention relates to absorption of phenolic compounds from liquids and gases by intimately contacting the such fluids with articles made from polymers of acrylonitrile.

The presence of phenolic residues in industrial liquors and gaseous combustion products is undesirable where frequent exposure to such liquors or gases is maintained by humans because of phenolic toxicity and the fact that phenolic compounds have been experimentally observed to function as promoters for carcinogens.

In other cases it is desirable to remove small amounts of phenolic compounds from liquids and gases during the course of organic syntheses.

It is, therefore, an object of this invention to provide an effective method for extraction of phenolic compounds from liquids and gases. A further object of the invention is to provide a method for the filtration of liquids and gases containing phenolic compounds to effect removal of the phenolic compounds.

The objects of this invention are accomplished by intimately contacting a liquid or a gas containing phenols with polymers of acrylonitrile. It has been observed that phenolic compounds possess a striking affinity for polymers of acrylonitrile which affinity is not shown for other polymers, such as cellulose acetate.

The object of this invention may be broadly performed by intimately contacting any acrylonitrile fiber with the phenol containing fluid. While this discovery is not limited by the particular form of the polymer, such as bulk polymers, films and the like, superior results from a quantitative standpoint can be obtained by employing the polymer in the form of a web, matt or similar type fibrous form of the polymer.

The polymers useful in the extraction process of this invention are the resinous polymers containing at least 50 percent, and preferably at least 85 percent of acrylonitrile. The polymer may be a fiber-forming homopolymer or interpolymer of acrylonitrile with one or more ethylenically unsaturated monomers copolymerizable therewith, such as acrylamide, acrylic acid, methacrylic acid, methyl acrylate, methyl methacrylate, vinylidene chloride, vinyl chloride, vinyl bromide, vinyl alcohol, vinyl acetate, vinyl pyridine, vinyl pyrrolidone, vinyl pyrrolidine, styrene and the like. Moreover, the acrylonitrile polymer may be blended with other synthetic polymers.

The phenolic compounds which may be extracted according to this invention are the hydroxyl derivatives of mono and polycyclic aromatic compounds, the most common of which are phenol and naphthol. These may be substituted with groups such as carboxyl, alkyl, amino, carbalkoxy, nitro, alkoxy, halogen and the like. Representative of the phenolic compounds which may be extracted are the cresols, the xylylenols, o-amino phenol, m-nitrophenol, p-methoxy phenol, salicyclic acid, o-chlorophenol, o-acetyloxy phenol, p-chlorophenol, resorcinol and hydroquinone.

As above indicated extraction or filtration according to this invention may best be accomplished by employing an acrylonitrile polymer in fibrous form such as matt, tow or the like to gain the advantage of a large surface area through which intimate contact can be more readily made. While absorption is effective at ambient temperatures, it has been found that elevated temperatures enhance the rate and capacity of the polymer materials for absorption. Affinity of the phenolic compounds may also be enhanced by increasing the acidity of the polymer composition, for example, by adding a mineral acid, although good affinity will be observed where the pH of the polymer is around 7. The period of intimate contact depends primarily on the concentration of the phenolic fraction in the liquid or gas and the weight of the filter material. Rapid extraction or filtration is found where the concentration of the phenolic residue is less than about 1 percent, for example, although higher concentration of phenol may be removed. For example, the method is useful on liquids having a phenolic content of up to about 10 percent by weight. Phenolic saturation of the filter material may be gradual and it will prove advantageous to provide a new filter when efficiency decreases. One such mode of operation involves a series of separate filters of acrylonitrile polymers wherein the filter having the longest duration of service is removed and replaced by a new filter adjacent to that having the least service.

The following examples are intended to illustrate the invention.

EXAMPLE I

A solution of 5 gms. of β-naphthol was dissolved in 3,000 gms. of water. A matt weighing 100 gms. composed of fibers of a blend of two acrylic polymers being 88 percent by weight of a copolymer of 93 percent by weight of acrylonitrile and 7 percent by weight of vinyl acetate and 12 percent of a copolymer of equal parts of acrylonitrile and methyl vinyl pyridine was immersed in the solution of β-naphthol whereupon the vessel is heated to a boil for one hour after which the matt is removed and rinsed with water. Analysis of the remaining solution indicates that near quantitative absorption of the naphthol from the solution. Affinity exhibited by β-napthol for 100 gms. of a cotton matt under the same conditions is quite low.

EXAMPLE II

A solution of 5 gms. of o-amino phenol in 10 gms. of methanol was dispersed in 3,000 gms. of water. A sample weighing 100 gms. of a napped fabric composed of fibers of a copolymer of 93 percent by weight of acrylonitrile and 7 percent by weight of vinyl acetate was immersed in the aqueous dispersion of o-amino phenol whereupon the vessel is heated to a boil for one hour. The napped fabric was then removed and rinsed with water at ambient temperature. Quantitative determinations for o-amino phenol in the liquid indicated that less than one percent of the original concentration remained in the water. Nearly quantitative extraction by the acrylonitrile fibers was accomplished.

The same experiment was conducted substituting only 100 gms. of a napped cotton fabric for the fabric composed of acrylonitrile polymer fibers. Quantitative determination for o-amino phenol in the aqueous dispersion after heating for one hour indicated less than about one percent extraction by the cotton fibers of the o-amino phenol from its aqueous dispersion. The comparison shows the striking affinity of o-amino phenol for acrylonitrile polymers whereas the affinity for the cellulose material is quite low.

The fabric samples thus treated were then separately immersed in an aqueous solution containing 3,000 gms. of water, 5 gms. of sodium nitrite and 3 gms. of concentrated sulfuric acid to diazotize the o-amino phenol extracted by the fabric samples. The cotton fabric was colored only a faint yellow where the acrylonitrile based fabric was colored a deep brown. Fiber cross-section analysis of the diazotized fabrics indicated a faint yellow ring only on the surface of the cotton fiber whereas the acrylonitrile based fiber was colored deep brown throughout the cross-section. This indicates complete penetration by the o-amino phenol throughout the cross-section of the acrylonitrile fiber and only minor surface penetration on the cotton fiber.

EXAMPLE III

A fibrous mat composed of fibers of a copolymer of acrylonitrile and vinyl acetate was continuously passed over and in contact with the upper edge of an open vessel containing o-amino phenol. The vessel was then heated to 175–184° C. causing sublimation of the amino phenol whereupon the vapor blended with air present in the vessel chamber rising upward to pass in contact with the acrylonitrile fiber mat passing across the top surface of the sublimation vessel. A hood, situated above the upper surface of the sublimation vessel, having installed therein an exhaust fan in combination with a two inch fiber mat, six inches in diameter which fiber mat served to extract the toxic off-gases of the sublimation vessel not extracted by the continuously moving mat.

Treatment of the fiber mat having o-amino phenol absorbed therein with a diazotization solution as described in Example I resulted in deep-dyed fibers having a uniform and thorough penetration of coloration. A similar trial using a mat of cellulose acetate fibers resulted in only minor absorption of o-amino phenol and coloration of fibers. Moreover, it was observed that the acrylonitrile polymer mat employed as a filter in the hood became saturated with amino phenol over a very short period of time.

This invention is not intended to be limited to the specific working embodiments described herein because there are other useful embodiments which are readily apparent to those skilled in the art. For example, the phenolic fraction in tobacco smoke may be nearly quantitatively removed by causing the mainstream smoke of a cigarette to pass through a filter material comprising the polymers described above.

I claim:
1. A method for extracting phenols from fluids which comprises intimately contacting said fluids with polymers of acrylonitrile.
2. The method of claim 1 wherein said fluids are selected from the group consisting of liquids and gases.
3. The method of claim 2 wherein said fluid is a gas.
4. The method of claim 1 wherein said polymers are fibers.
5. The method of claim 1 wherein said polymers of acrylonitrile are interpolymers of acrylonitrile and at least one other ethylenically unsaturated monomer copolymerizable therewith.
6. A fiber of an acrylonitrile polymer having absorbed therein a phenol.
7. The fiber of claim 6 wherein the phenol is naphthol.
8. A fiber composed of an interpolymer of acrylonitrile and at least one other ethylenically unsaturated monomer copolymerizable therewith, having absorbed therein up to about 10 percent by weight of a phenol.

References Cited

UNITED STATES PATENTS

| 2,888,095 | 5/1955 | Pervini et al. | 55—487 |
| 3,062,739 | 11/1962 | Grits | 210—24 |
| 3,118,750 | 1/1964 | Dunlap et al. | 55—524 |

FOREIGN PATENTS 224,705    10/1959    Australia.

REUBEN FRIEDMAN, *Primary Examiner.*

C. N. HART, *Assistant Examiner.*

U.S. Cl. X.R.

55—522; 210—24, 502